(12) United States Patent
Wong et al.

(10) Patent No.: US 8,672,086 B2
(45) Date of Patent: Mar. 18, 2014

(54) TORQUE SENSOR TYPE POWER STEERING SYSTEM WITH SOLID STEERING SHAFT AND VEHICLE THEREWITH

(75) Inventors: Ray Tat-Lung Wong, Richmond (CA); Eric B. Fetchko, Burnaby (CA); Wan Yan Ho, Vancouver (CA); Xue Mei Liu, Vancouver (CA)

(73) Assignee: Marine Canada Acquisition Inc., Richmond (CA)

( * ) Notice: Subject to any disclaimer, the term of this patent is extended or adjusted under 35 U.S.C. 154(b) by 324 days.

(21) Appl. No.: 11/832,911

(22) Filed: Aug. 2, 2007

(65) Prior Publication Data
US 2009/0032328 A1 Feb. 5, 2009

(51) Int. Cl.
*B62D 5/00* (2006.01)
(52) U.S. Cl.
USPC ............................. 180/446; 180/443; 180/444
(58) Field of Classification Search
USPC .......................................... 180/446, 443, 444
See application file for complete search history.

(56) References Cited

U.S. PATENT DOCUMENTS

| | | | | |
|---|---|---|---|---|
| 4,896,544 A * | 1/1990 | Garshelis | ................. | 73/862.333 |
| 5,708,216 A * | 1/1998 | Garshelis | ................. | 73/862.335 |
| 5,887,335 A * | 3/1999 | Garshells | ..................... | 29/602.1 |
| 6,047,605 A | 4/2000 | Garshelis | | |
| 6,260,423 B1 * | 7/2001 | Garshelis | ................. | 73/862.336 |
| 6,360,841 B1 * | 3/2002 | Blandino et al. | ............. | 180/443 |
| 6,439,066 B1 * | 8/2002 | Norton | ..................... | 73/862.333 |
| 6,490,934 B2 * | 12/2002 | Garshelis | ................. | 73/862.336 |
| 6,516,508 B1 * | 2/2003 | Gandarillas | ................. | 29/602.1 |
| 6,553,847 B2 * | 4/2003 | Garshelis | ................. | 73/862.336 |
| 6,564,654 B2 * | 5/2003 | Madni et al. | ............. | 73/862.337 |
| 6,581,477 B1 * | 6/2003 | Berger et al. | ............. | 73/862.322 |
| 6,581,480 B1 * | 6/2003 | May et al. | ................. | 73/862.333 |
| 6,763,738 B1 * | 7/2004 | Tsutsui et al. | ............ | 74/388 PS |
| 6,837,116 B2 * | 1/2005 | Desbiolles | ............... | 73/862.335 |
| 6,871,553 B2 * | 3/2005 | Naidu et al. | ............. | 73/862.331 |
| 6,880,254 B2 * | 4/2005 | Uehira et al. | ................... | 33/1 PT |
| 6,912,922 B2 * | 7/2005 | Cheshmehdoost et al. | ......................... | 73/862.333 |
| 7,024,946 B2 * | 4/2006 | Nehl et al. | ................ | 73/862.333 |
| 7,077,235 B2 * | 7/2006 | Eda et al. | ....................... | 180/444 |
| 7,127,797 B1 * | 10/2006 | Kilmartin et al. | ............. | 29/602.1 |
| 7,182,169 B2 * | 2/2007 | Suzuki | ........................... | 180/426 |
| 7,183,681 B2 * | 2/2007 | Segawa et al. | .............. | 310/68 B |

(Continued)

OTHER PUBLICATIONS

Yoneda et al., "Cogging Torque Target and Design of Motor for EPS", SAE Technical Paper Series, Apr. 3-6, 2006, Doc No. 2006-01-1320, USA.

(Continued)

*Primary Examiner* — Kevin Hurley
*Assistant Examiner* — Michael Stabley
(74) *Attorney, Agent, or Firm* — Cameron IP (57) ABSTRACT

A steering apparatus includes a rotatable steering shaft having an exterior, an input end for connecting a steering member and an output end for connecting to at least one steerable wheel of a vehicle. An electric motor is operatively connected to the steering shaft for rotating the steering shaft. The shaft is magnetized and serves as a torque sensor transducer. At least one magnetic field sensor is adjacent to the exterior of the steering shaft. The steering shaft and the at least one magnetic field sensor form a torque sensor for sensing torque applied to the steering shaft by the manually operable steering member and provide a signal to operate the electric motor to assist steering of the steering shaft by the manually operable steering member.

18 Claims, 6 Drawing Sheets

(56) References Cited

U.S. PATENT DOCUMENTS

| | | | |
|---|---|---|---|
| 7,363,827 B2 * | 4/2008 | Hedayat et al. | 73/862.333 |
| 7,469,604 B2 * | 12/2008 | Hedayat et al. | 73/862.331 |
| 7,806,005 B2 | 10/2010 | Watanabe et al. | |
| 2001/0035056 A1 * | 11/2001 | Garshelis | 73/862.336 |
| 2002/0059839 A1 * | 5/2002 | Cheshmehdoost et al. | 73/862.333 |
| 2002/0112549 A1 * | 8/2002 | Cheshmehdoost et al. | 73/862.333 |
| 2004/0025600 A1 * | 2/2004 | Viola et al. | 73/862.335 |
| 2005/0247138 A1 * | 11/2005 | Nakane et al. | 73/862.331 |
| 2007/0000716 A1 * | 1/2007 | Ponziani | 180/444 |
| 2007/0251333 A1 * | 11/2007 | Watanabe et al. | 73/862.333 |

OTHER PUBLICATIONS

"Torque Sensor Design & Dimension", NCTE, May 2006, www.ncte.com.

* cited by examiner

TORQUE SENSOR TYPE POWER STEERING SYSTEM WITH SOLID STEERING SHAFT AND VEHICLE THEREWITH

BACKGROUND OF THE INVENTION

1. Field of the Invention

The present invention relates to power assist steering systems for vehicles and, in particular, to electric power assist steering systems employing torque sensors for vehicles provided with handlebars.

2. Description of the Related Art

Electric power assist steering systems are well-known and are used for such purposes as recreational vehicles and small utility vehicles. One type of electric power steering system includes an electric motor which is coupled to the steering shaft, typically including a worm mounted on the drive shaft of the motor which engages a worm gear mounted on the steering shaft.

In some prior art examples the systems include a hollow steering shaft which has a narrower internal shaft (also known as the torsion bar) serving as a transducer for a torque sensor. Examples are found in U.S. Pat. Nos. 6,360,841; 7,182,169; 7,183,681; and 7,077,235. The steering shaft itself is typically made of several components. The result may be a system which lacks a sharp and direct steering feel due to play between the different components.

These earlier steering devices with torsion bars are typically acceptable for multiple turn steering systems such as cars and trucks. A typical torsion bar in such a system has a ±4° to ±8° sensing range and a steering wheel range of 720° to 1440°. The torsion bar compliance is approximately 1% of the steering range. However, when a steering system of this type is employed in a vehicle with roughly 90° steering range, for example vehicles with handlebars or tiller steering, then the torsion bar compliance can be 9°-18° due to the higher torque applied to the steering shaft of such vehicles.

Referring to stiffness, torsion bars employed in the past typically range from 120 Nm/rad. to 900 Nm/rad. The electric power steering shaft stiffness is dominated by the torsional region the steering shaft as referenced in SAE paper 2006-01-1320. Such systems use a relatively soft shaft (in torsional stiffness) because of the sensing technology employed. The more displacement, the higher the sensitivity that can be achieved with displacement sensors such as a potentiometer.

Another example of using torsion bars with magnetoelastic sensing technology can be found in U.S. Pat. No. 6,360,841 with ±4 or ±8° of compliance. The stiffness is dominated by the torsional region. A low stiffness system makes it difficult however for handlebar vehicles to avoid oscillation during double lane change maneuvers if they were equipped with such systems.

For instance, when a torsion bar of this type is employed in such a vehicle in a double lane change driving test, the steering system may experience significant overshoot and oscillation. Accordingly there is a need for an improved electric power assist steering system suitable for such purposes as recreational vehicles, particularly those employing handlebars for steering.

BRIEF SUMMARY OF THE INVENTION

According to one aspect of the invention there is provided a steering apparatus which includes a rotatable steering shaft having an exterior, an input end for connecting a steering member and an output end for connecting with at least one steerable wheel of a vehicle. An electric motor is operatively connected to the steering shaft for rotating the steering shaft. The shaft has at least a portion thereof made of a magnetoelastic material and having a defined axially extending and circumferentially extending surface area which carries a magnetic field. At least one magnetic field sensor is adjacent to the exterior of the steering shaft. The steering shaft and the at least one magnetic field sensor form a torque sensor for sensing torque applied to the steering shaft by the steering member and provide a signal indicative of torque applied to the steering shaft by the steering member.

According to another aspect of the invention there is provided a vehicle having a frame, a plurality of wheels including at least one steerable wheel, a steering member for steering said at least one steerable wheel and an electric steering apparatus having a rotatable steering shaft. The shaft has an exterior, an input end for connecting the steering member and an output end for connecting with said at least one steerable wheel of the vehicle. An electric motor is operatively connected to the steering shaft for rotating the steering shaft. The shaft has at least a portion thereof made of a magnetoelastic material and having a defined axially extending and circumferentially extending surface area which carries a magnetic field, the magnetic field varying upon twisting of the steering shaft. There is at least one magnetic field sensor adjacent to the exterior of the steering shaft, the steering shaft and said at least one magnetic field sensor forming a torque sensor for sensing torque applied to the steering shaft by the manually operable steering member and providing a signal indicative of torque applied to the steering shaft by the steering member.

BRIEF DESCRIPTION OF THE DRAWINGS

The present invention will be more readily understood from the following description of preferred embodiments thereof given, by way of example, with reference to the accompanying drawings, in which.

DESCRIPTION OF THE PREFERRED EMBODIMENTS

Figure 1:
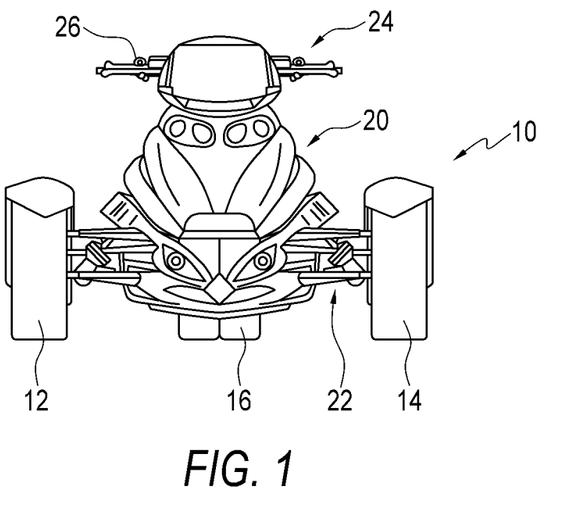
FIG. 1 is a front elevational view of a three wheeled vehicle including a steering apparatus according to an embodiment of the invention.

Referring to the drawings and first to FIG. 1, this shows a three wheeled vehicle 10 which includes a pair of front, steerable wheels 12 and 14 and a rear wheel 16. The vehicle includes a frame illustrated generally at 20 and a steering mechanism illustrated generally at 22. There is a manually steerable member illustrated generally at 24 in FIG. 1 which includes handlebars 26 for steering the front wheels 12 and 14. It should be understood that this type of vehicle is illustrated by way of example only and the invention is also applicable to other types of vehicles with at least one steerable wheel.

Figure 2:
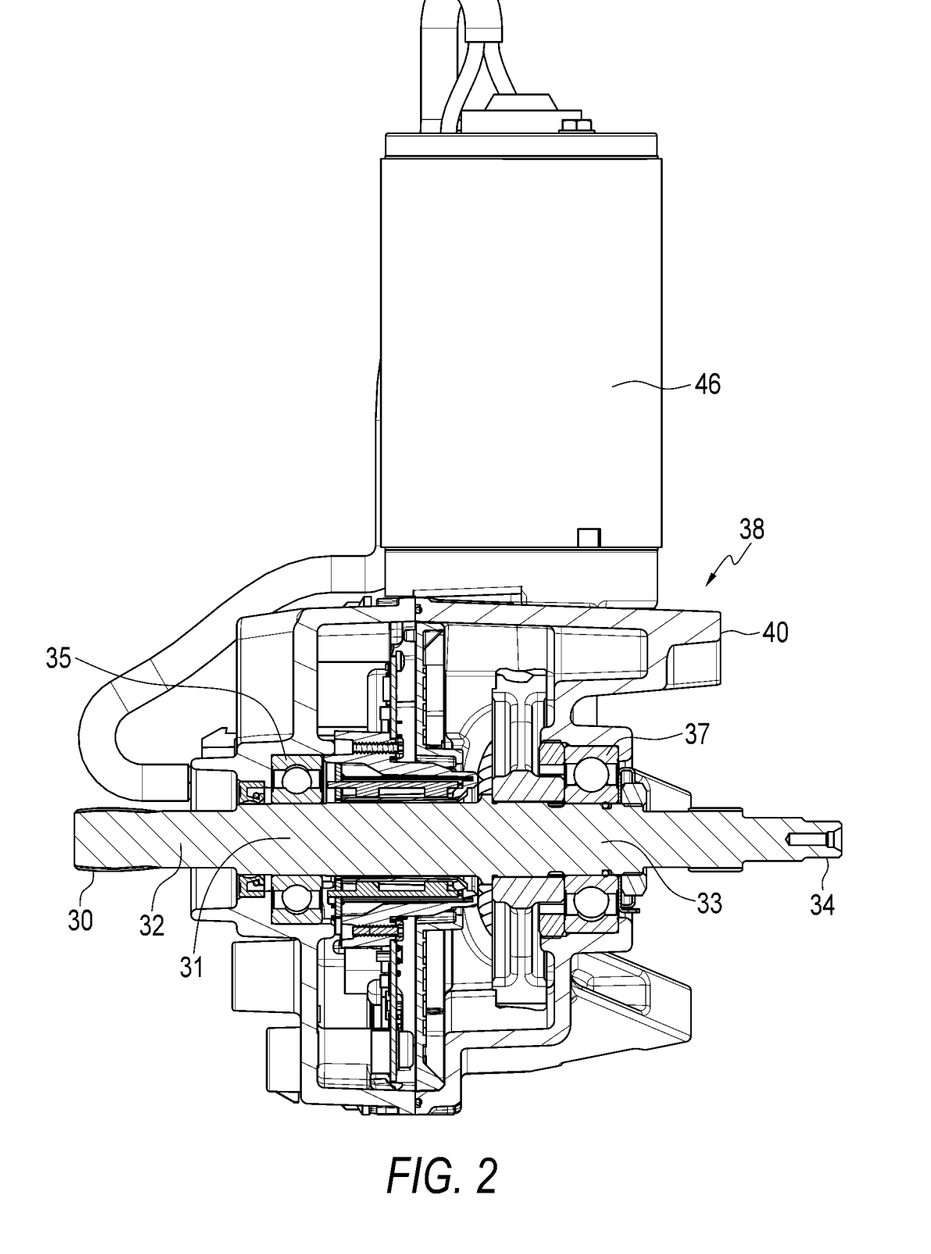
FIG. 2 is a side view, partly in section, of the steering apparatus according to an embodiment of the invention.

The handlebars are mounted on input end 30 of a steering shaft 32 illustrated in FIG. 2. Output end 34 of the steering shaft is operatively connected to the steering mechanism 22 in a manner well known in the art. Accordingly this arrangement is not described in more detail. The steering shaft forms part of steering apparatus 38 illustrated in FIGS. 2 and 3. This is an electric power assist type of steering apparatus. The general arrangement is well known in the art.

Figure 3:
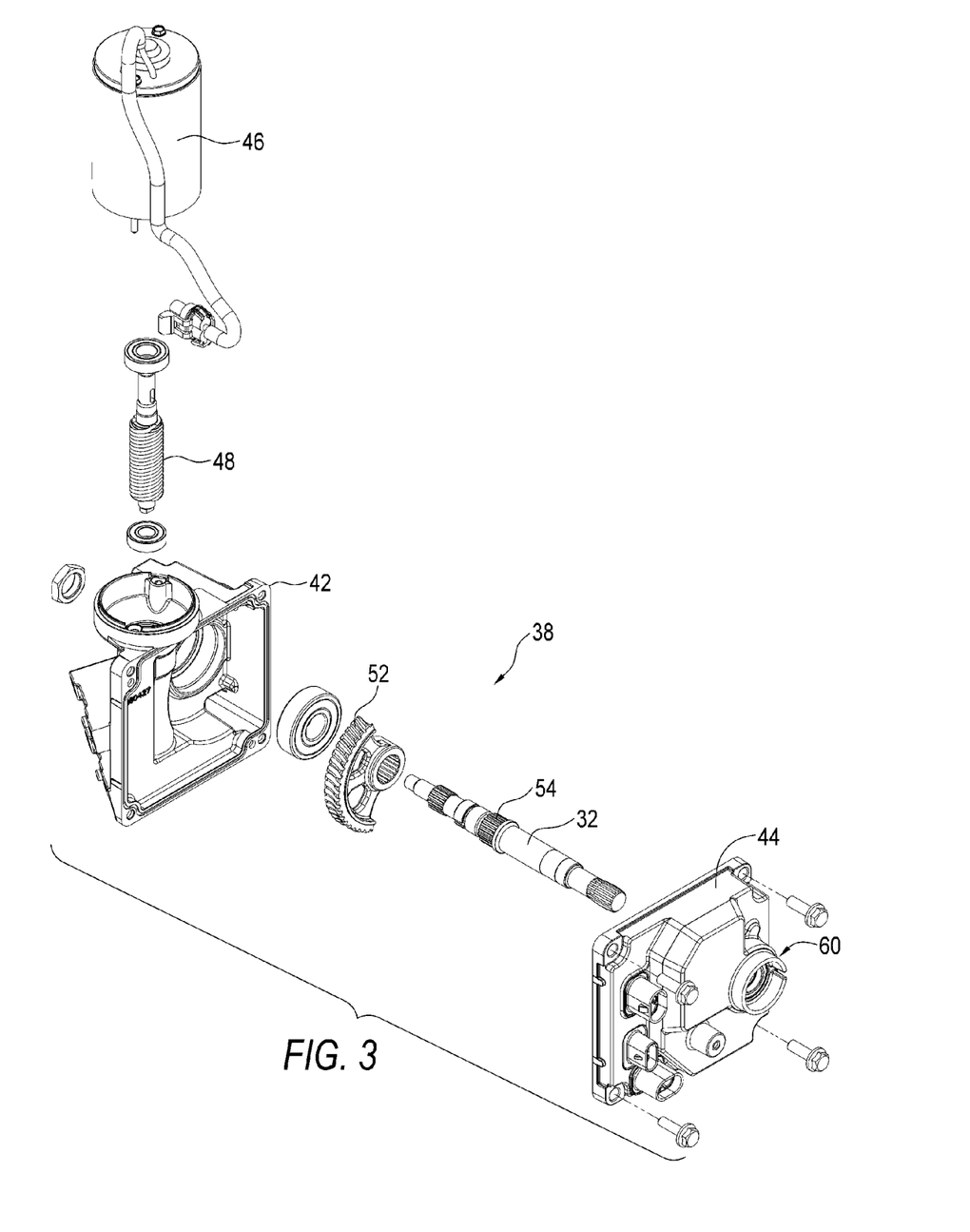
FIG. 3 is an exploded, isometric view of the steering apparatus of FIG. 2.

The apparatus includes a housing 40, illustrated in FIG. 2, including two halves 42 and 44 illustrated in FIG. 3. An electric motor 46 is mounted on the housing. A worm 48 is connected to the shaft of motor and meshes with a worm gear 52, a sector gear in this example, which is mounted on splines 54 of steering shaft 32. Thus rotation of the electric motor 46 causes rotation of the worm 48 which in turn rotates the steering shaft 32 and the sector gear 52. A sector gear only is required in this embodiment because the handlebars 26 of the vehicle illustrated in FIG. 1 can only be steered through an angle significantly less than ±180°, preferably less than ±90° and ±45° in this example. The sector gear in this embodiment is of metal, but could alternatively be made of plastic. In this embodiment the sector gear comprises approximately one quarter of a circle. The shaft has two spaced-apart bearing portions 31 and 33 only, illustrated in FIG. 2, supported by bearings 35 and 37. This compares to prior art steering systems typically requiring three bearing portions.

Figure 4:
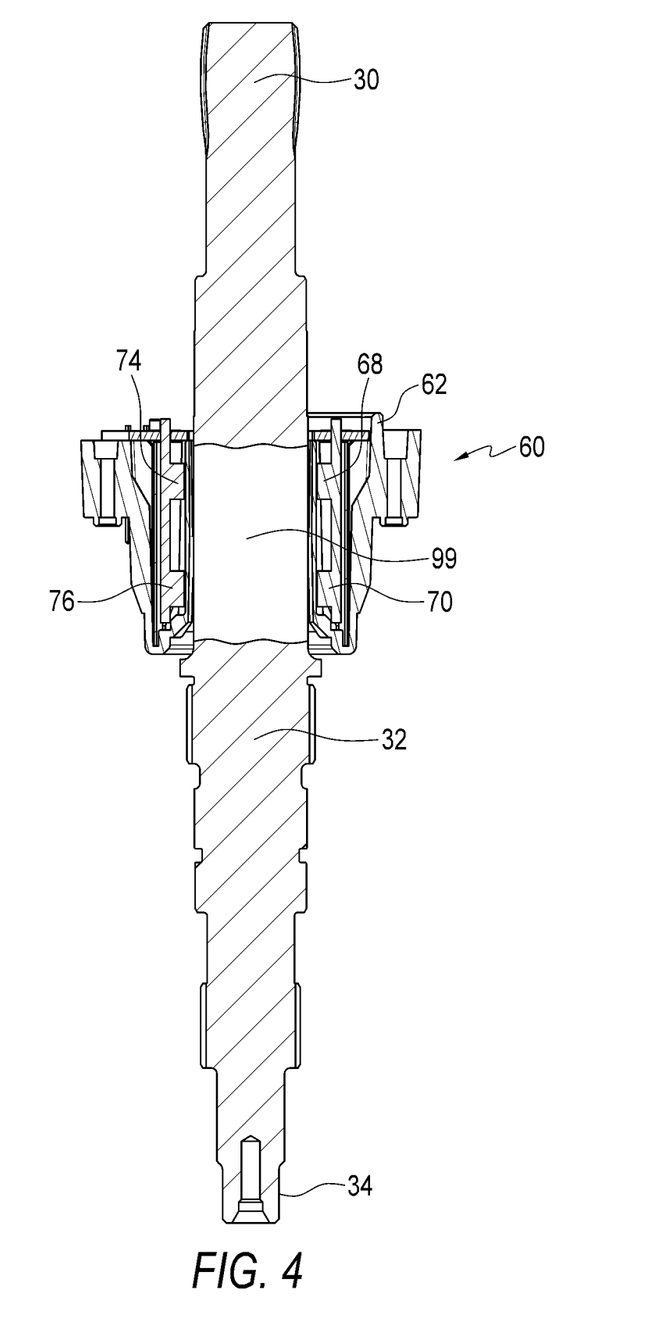
FIG. 4 is a longitudinal sectional view of the steering shaft and torque sensor assembly thereof.
Figure 5:
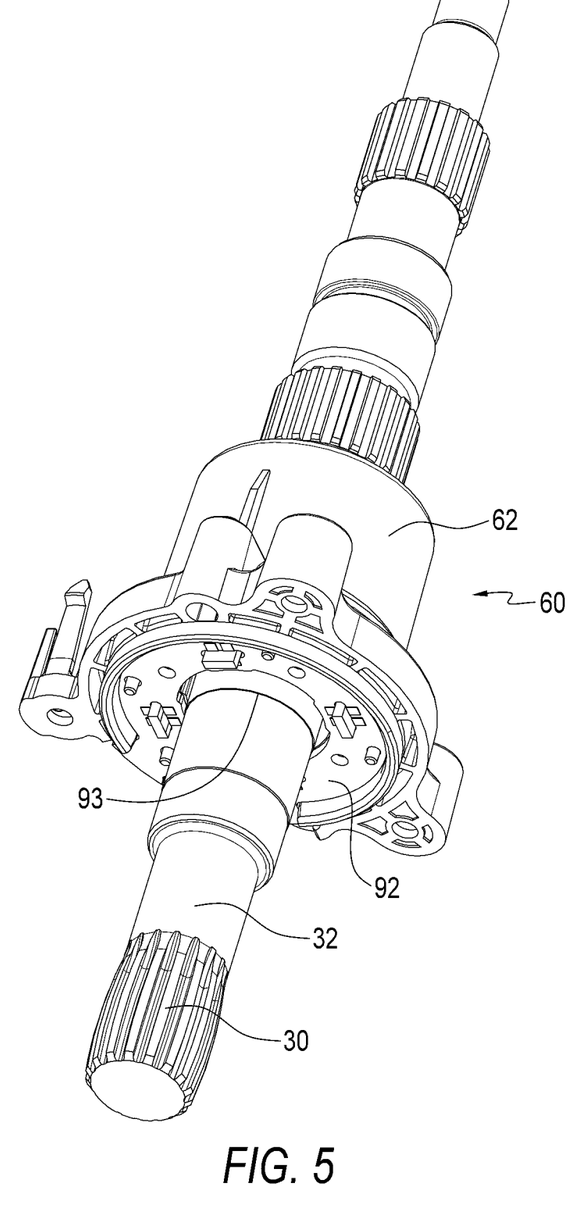
FIG. 5 is an isometric view of the steering shaft and torque sensor assembly of FIG. 4.
Figure 6:
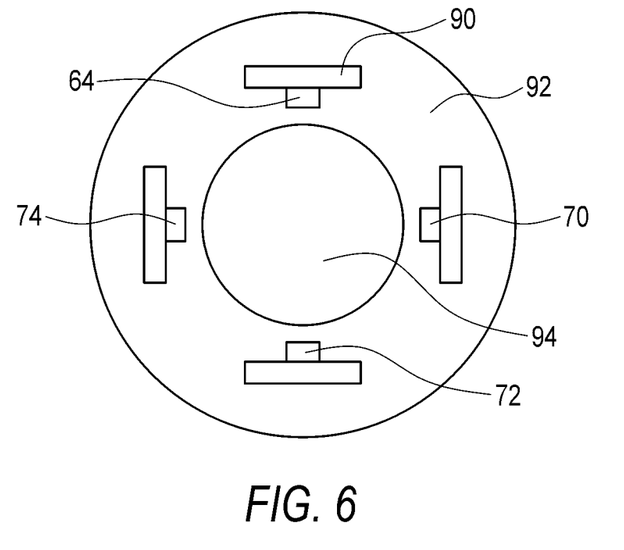
FIG. 6 is a perspective view of the magnetic field sensor assembly of the steering apparatus of FIGS. 2 and 3.

The steering apparatus includes a magnetic field sensor assembly 60 illustrated in FIG. 5 which is mounted on the housing 40. The sensor assembly 60 includes a sensor housing 62 which extends about the steering shaft 32. As is known in the art, the assembly includes at least one magnetic field sensor. In this example there are eight magnetic field sensors, four of which, namely sensors 64, 70, 72 and 74 are illustrated in FIG. 6. These are arranged in sets of two sensors 90° spaced-apart about the shaft. Each set of two sensors, for example sensors 68 and 70, and sensors 74 and 76 is mounted on a sensor mount 90 illustrated in FIG. 6 which is connected to an annular member 92 having an opening 94 through which the steering shaft extends. It may be seen that the shaft is tapered from portion 99 towards the output end 34, as seen in FIG. 4, thus allowing insertion of the shaft into the opening 94 of the sensor mount and corresponding opening 93 of the housing 40 illustrated in FIG. 5.

Four of these magnetic field sensors 68, 70, 74 and 76 are illustrated in the sectional view of FIG. 4. These magnetic field sensors are located and oriented relative to steering shaft 32, acting as a torque sensor transducer, so as to sense the magnitude and polarity of the field arising in the space about the shaft as a result of the reorientation of the polarized magnetization due to torsional stress from the quiescent circumferential direction to a more or less steep helical direction. The magnetic field sensor assembly 60 provides a signal output reflecting the magnitude and direction of torque applied to the shaft 32. In one example the magnetic field sensors are integrated circuit Hall effect sensors.

As stated the steering shaft acts as a transducer for the torque sensor. It includes one or more axially distinct, magnetically contiguous, oppositely polarized circumferential bands or regions. The shaft in this example is formed of a ferromagnetic, magnetostrictive material having the desired crystalline structure. The shaft has at least a portion 99 thereof made of a magnetoelastic material and having a defined axially extending and circumferentially extending surface area which carries a magnetic field, the magnetic field varying upon twisting of the shaft. The steering shaft in this embodiment is a solid one-piece member of case hardened steel, 9310 steel in this example although other materials could be used.

Accordingly it may be seen that all of the torque applied to the handlebars 26 is transferred to the steerable wheels 12 and 14 by the steering shaft 32. Collarless circularly magnetized torque transducers are known as disclosed in U.S. Pat. No. 6,047,605, the disclosure of which is incorporated herein by reference. Alternatively, as is known in the prior art, the shaft could have a magnetized ring extending about the shaft adjacent to the magnetic field sensors. In this case the shaft could be of a non-magnetic materials such as stainless steel.

Three important criteria of a steering system of this type are, in descending order of importance, torque range, stiffness, and control bandwidth.

First, considering torque range, the torque control scheme should be set so as to distinguish foreseeable operating torque from the driver during driving conditions. Typically, in a steering system without power assist, torque user torque can range from 25 Nm to 50 Nm during most of the driving. With maximum payload and maximum frictional surfaces such as hot pavement, the user torque can reach 80 Nm. Accordingly the sensing range in this example is set at ±90 Nm.

The material and size of the steering shaft is selected so that the torque range is 20-30% of the yield strength of the torque sensor region 99 for the torque sensing range. The diameter of the sensing region of the shaft in this example is approximately 21 mm. As stated the shaft in this example is of AISI 9310 steel which is carburized to a case hardened range. This references to U.S. Pat. No. 6,553,847 which is incorporated herein by reference. However other materials may be used to fit the sensor requirement.

It is also important to balance the torque sensitivity and torque range that can be measured. In the present system the torque sensitivity is 1% F.S., ±0.9 Nm. for a ±90 Nm range.

The stiffness of the electric power steering system is defined as the rotational stiffness from the input shaft to the output shaft. The stiffness in the area 99 of the sensors is 18,100 Nm./rad., 19,900 Nm./rad. adjacent the input and output splines and 31,425 Nm./rad. for the rest of the steering shaft in this example. The total stiffness of the electric power steering system in this example is 6200 Nm./rad. For example, if there is 90 Nm of torque experienced in the shaft, there will be 0.8° compliance. It should be noted that these figures are for a particular example and can vary significantly in different embodiments of the invention. The stiffness may be between 2900 Nm./rad. and 6200 Nm./rad, and preferably between 4400 Nm./rad. and 6200 Nm./rad.

In another example, stiffness in the center sensing region is 9500 Nm./rad. The total steering shaft stiffness is 4400 Nm./rad. Both this design and the one discussed above have yielded satisfactory steering performance. With a minimum stiffness of 2900 Nm./rad such that the diameter of the sensing region of the shaft is approximately equal to 12 mm with approximately 1° of compliance in typical driving, the steering performance has been found to be appropriate.

The stiffness of a steering shaft according to the present invention is significantly greater than conventional prior art electric steering systems. By increasing stiffness of the shaft 3.5-7 times, the natural frequency of the system increases, typically in square root relationship. Therefore the natural frequency is increased by 1.9-2.6 times. The increased natural frequency increases the control bandwidth. For a change of steering angle, such as one during a double lane change, overshoot and oscillation is minimized.

Improvement on the stiffness also improves steering accuracy. The compliance of the steering shaft is minimal compared with the steering angle. The vehicle dynamic or nimbleness is maintained.

Also, with the stiffness of the shaft being as high as discussed above, and with a maximum torque sensing range being 20-30% of the yield strength of the shaft, the steering assembly can be much simplified to remove the rotational stop features required in, for example, U.S. Pat. No. 6,360,841 during manual steering in the case of malfunction of the power assistance mechanism.

A steering system according to the invention is also useful for jet boats where the typical steering range is less than 360° (less than ±180°).

As will be apparent to those skilled in the art, various modifications may be made within the scope of the appended claims.

What is claimed is:

1. A steering apparatus comprising:
   a rotatable steering shaft having an exterior, an input end for connecting with a manually operable steering member and an output end for connecting with at least one steerable wheel of a vehicle;
   an electric motor operatively connected to the steering shaft for rotating the steering shaft, the steering shaft having at least a portion thereof made of a magnetoelastic material and having a defined axially extending and circumferentially extending surface area on the exterior of the steering shaft which carries a magnetic field;
   at least one magnetic field sensor being adjacent to the exterior of the steering shaft, the steering shaft and said at least one magnetic field sensor forming a torque sensor for sensing torque applied to the steering shaft by the manually operable steering member and providing a signal indicative of torque applied to the steering shaft by the steering member; and
   an annular member securing the at least one magnetic field sensor, the annular member having an opening dimension just large enough to allow the steering shaft to extend therethrough;
   wherein the portion of the steering shaft is a magnetic ring extending about the steering shaft adjacent said at least one magnetic field sensor.

2. The steering apparatus as claimed in claim 1, wherein the portion of the steering shaft is such that the magnetic field varies upon twisting of the steering shaft.

3. The steering apparatus as claimed in claim 1, wherein the portion of the steering shaft is so formed as to serve as a torque sensor transducer.

4. The steering apparatus of claim 1, wherein the steering shaft, including said portion, is one piece.

5. The steering apparatus as claimed in claim 1, wherein the portion of the steering shaft is sized and the material is selected so that maximum torque applied to the steering shaft by the steering member is 20%-30% of the torsional yield strength of the portion of the steering shaft.

6. The steering apparatus as claimed in claim 5, wherein the maximum torque applied to the steering shaft is 90 Nm.

7. The steering apparatus as claimed in claim 1, wherein the steering shaft has an overall torsional stiffness of 2900-6200 Nm/Rad.

8. The steering apparatus as claimed in claim 1, wherein the steering shaft has an overall torsional stiffness of 4400-6200 Nm/Rad.

9. The steering apparatus as claimed in claim 1, wherein the portion of the steering shaft has a diameter of 12-21 mm.

10. The steering apparatus as claimed in claim 1, wherein the steering member is manually operable.

11. The steering apparatus as claimed in claim 1, wherein the steering shaft is configured so that all of the torque applied to said at least one steerable wheel by said steering member is transmitted by the steering shaft.

12. The steering apparatus as claimed in claim 1, wherein the steering shaft has two spaced-apart bearing portions only for supporting the steering shaft.

13. The steering apparatus as claimed in claim 1, wherein the steering shaft is tapered from the portion thereof towards the output end, allowing insertion of the steering shaft into an opening of a magnetic field sensor housing.

14. A steering apparatus comprising:
   a rotatable steering shaft having an exterior, an input end for connecting with a manually operable steering member and an output end for connecting with at least one steerable wheel of a vehicle, the steering shaft having at least a portion thereof made of a magnetoelastic material and having axially distinct, magnetically contiguous, oppositely polarized circumferential bands;
   an electric motor operatively connected to the steering shaft for rotating the steering shaft; and
   at least one magnetic field sensor being adjacent to the exterior of the steering shaft, the steering shaft and said at least one magnetic field sensor forming a torque sensor for sensing torque applied to the steering shaft by the manually operable steering member and providing a signal indicative of torque applied to the steering shaft by the steering member.

15. In combination, a manually operable steering member and the steering apparatus as claimed in claim 14.

16. In combination, a steerable wheel and the steering apparatus as claimed in claim 14.

17. In combination, a vehicle having at least one steerable wheel and the steering apparatus as claimed in claim 14.

18. The steering shaft as claimed in claim 14, wherein the shaft is formed of a ferromagnetic, magnetostrictive material.

* * * * *